L. M. TODD & C. G. TIEFEL.
CHECK PROTECTOR.
APPLICATION FILED MAY 16, 1912.

1,076,173.

Patented Oct. 21, 1913.

Inventors
Libanus M. Todd
Charles G. Tiefel

Witnesses

L. M. TODD & C. G. TIEFEL.
CHECK PROTECTOR.
APPLICATION FILED MAY 16, 1912.

1,076,173.

Patented Oct. 21, 1913.

Witnesses
Walter B. Payne
H. E. Stonebraker

Inventors
Tibanus M. Todd
Charles G. Tiefel

By Church & Rich
their Attorneys

L. M. TODD & C. G. TIEFEL.
CHECK PROTECTOR.
APPLICATION FILED MAY 16, 1912.

1,076,173.

Patented Oct. 21, 1913.

Witnesses
Walter B. Payne
H. E. Stonebraker

Inventors
Libanus M. Todd
Charles G. Tiefel
By
their Attorneys

UNITED STATES PATENT OFFICE.

LIBANUS M. TODD AND CHARLES G. TIEFEL, OF ROCHESTER, NEW YORK, ASSIGNORS TO G. W. TODD & COMPANY, OF ROCHESTER, NEW YORK, A FIRM COMPOSED OF GEORGE W. TODD AND LIBANUS M. TODD.

CHECK-PROTECTOR.

1,076,178.  Specification of Letters Patent.  Patented Oct. 21, 1913.

Application filed May 16, 1912. Serial No. 697,679.

*To all whom it may concern:*

Be it known that we, LIBANUS M. TODD and CHARLES G. TIEFEL, both of Rochester, in the county of Monroe and State of New York, have invented certain new and useful Improvements in Check-Protectors; and we do hereby declare the following to be a full, clear, and exact description of the same, reference being had to the accompanying drawings, forming a part of this specification, and to the reference-numerals marked thereon.

The present invention relates to check protectors having reference particularly to the type of machine embodying, generally, a printing wheel or die holder, and a platen, having movement relatively to each other for engaging a check or other negotiable paper, and it has for its object to provide an improved construction and arrangement of parts wherein the printing die is moved from an inking roll to the printing point by the initial movement of the operating lever, the further movement of which serves to cause engagement between the printing wheel and platen.

Another object of my invention consists of a novel arrangement of parts for obtaining movement of the printing wheel at the initial operation of the operating lever, by a mechanism which is positive in its operation and simple in construction.

A further object of the invention resides in the provision of improved means for supporting an ink supplying roll within the casing.

To these and other ends the invention consists in certain improvements and combinations of parts, all as will be hereinafter more fully described, the novel features being pointed out in the claims at the end of the specification.

In the drawings.

Similar reference numerals throughout the several figures indicate the same parts.

In the present embodiment of the invention, wherein we have disclosed a preferred arrangement, 1 designates the main casing within which is arranged the printing wheel, or die holder 2 having arranged thereon a plurality of dies 3, the die holder being suitably secured to the shaft 4 which is rotatably mounted in the casing. The die holder 2 carries a notched surface of suitable construction, comprising in the present embodiment, an annular plate 5 having a series of notches 6 formed on its inner edge. The die holder is arranged to be moved from the inking roll to the printing point, through the notches 6, in the manner that will now be described.

Figure 6:
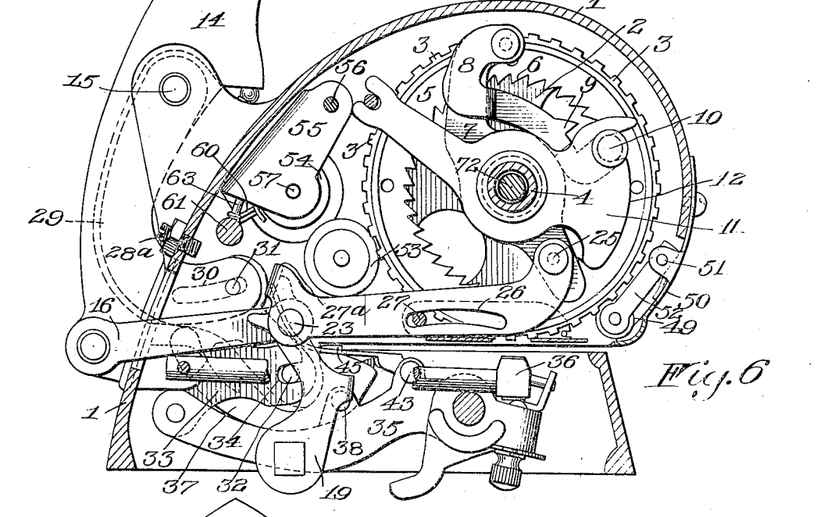
Fig. 6 is a transverse sectional view on the line 6—6 of Fig. 2.
Figure 7:
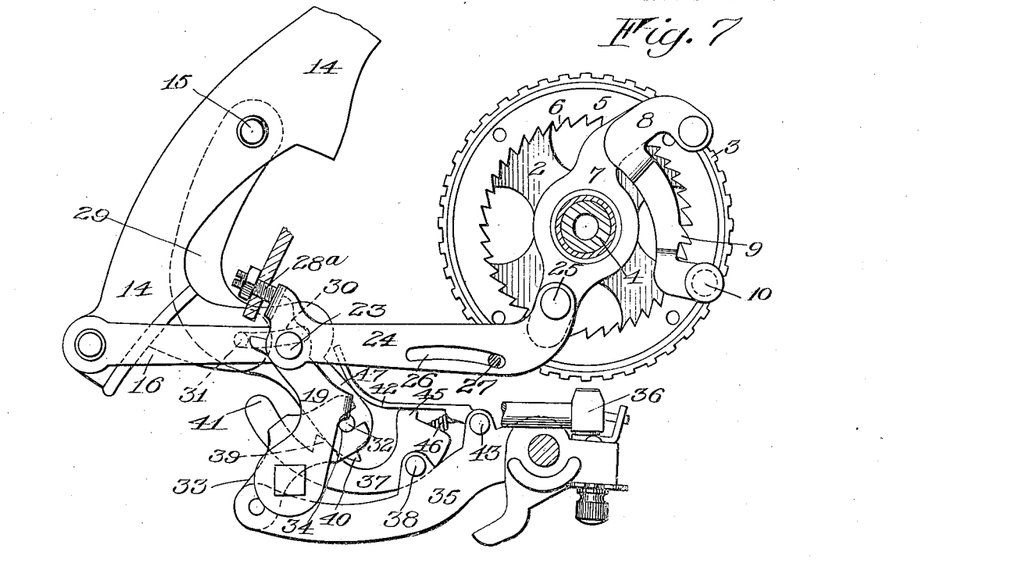
Fig. 7 is a sectional view taken in the same plane as Fig. 6, with parts broken away, showing the first position before the operation of the actuating device.

Journaled for rotation on the shaft 4 is a carrier designated at 7, and pivotally mounted on said carrier is an arm 8 having formed thereon a pawl or detent 9 which coöperates with the notches 6 on the die holder when the carrier is moved. The arm 8 is further provided with a projection, preferably in the form of an anti-friction roller 10, which coöperates with a stationary guide 11. The guide 11 includes a curved edge 12 and the recess 13 within which the roller 10 is normally positioned, as shown in Fig. 6. Upon movement of the carrier 7, the arm 8 is moved forwardly out of the recess 13 until the pawl 9 engages the notched plate 5. Further movement of the carrier causes the pawl to move downwardly, as shown in Figs. 7 to 10 inclusive, thus effecting movement of the die holder.

Figure 20:
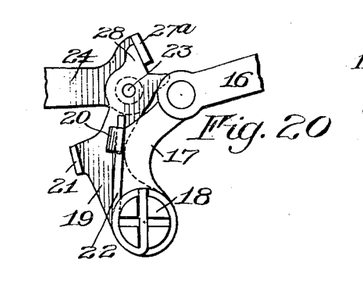
Fig. 20 is a detail elevation of the yieldable connection between the actuating device and the carrier, which operates the printing wheel.

The machine is controlled by an actuating device, comprising a lever 14 pivoted at 15 and operatively connected to the die holder and platen, as will be described hereinafter. The actuating device is so connected to the carrier 7 as to effect movement of the latter upon its initial operation, while during its final operation it effects movement of the platen to engage the die holder, a yieldable connection being provided between the carrier and the actuating device to permit of accomplishing this result. To this end, the actuating device 14 has pivoted thereto a link 16 which is pivotally connected in turn to a member 17, the latter being journaled on the post 18 which carries a member 19. The members 17 and 19 are provided with limiting stops 20 and 21 respectively, while a spring 22 attached to the post 18 and having one end abutting the stop 20 serves to retain the members 17 and 19 normally in transverse alinement. The member 19 is pivotally connected at 23 to a link 24 which is in turn pivotally connected to the carrier 7 at the point 25. The link 24 is slotted at 26 to receive the rod 27 on which it travels, the latter being suitably fixed in the casing. The link 24 carries a laterally projecting flange 27ª which is engaged by an ear 28 formed on the member 19, as shown in Fig. 20. By this construction, upon the initial movement of the actuating device, links 16 and 24 are moved equally, the spring 22 being strong enough to retain the members 17 and 19 in coöperative engagement until the lug 27ª engages the adjustable pin 28ª on the casing 1. This limits the movement of the link 24 and of the carrier, and the relatively movable members 17 and 19 permit further movement of the actuating device, when sufficient pressure is applied to overcome the tendency of the spring 22, so as to operate the platen in the manner that will now be described.

The actuating device is recessed interiorly to receive a lever 29 which is also pivotally mounted at 15, and provided with a slot 30 arranged to be engaged by a pin 31, the latter being fixed to the actuating device. The slot 30 permits the actuating device to be moved sufficiently to operate the die holder, in order to bring the die to the printing point, before the platen is operated, and when the pin 31 reaches the end of the slot 30, the lever 29 moves with the actuating device 14, and operates the platen through the following connecting parts. The lever 29 carries a pivot pin 32 which coöperates with a pair of toggle links 33 arranged on opposite sides of the lever, and provided with recesses 34 which receive the ends of said pin 32. The toggle links 33 are pivotally connected to the platen lever 35 which coöperates with the platen 36 in the manner set forth in our pending application, filed January 23, 1911, Serial No. 604,128. In order to insure further movement of the lever 29, and to prevent its return before it has moved a sufficient distance to make the impression on the paper, we provide a mechanism similar to that set forth in our pending application, already referred to, and consisting, in the present embodiment, of a detent 37 which is pivoted to the platen lever at 38, and is provided with a shoulder 39 arranged to engage a corresponding shoulder 40 on the end of the lever 29. When the actuating device is moved to the position shown in Fig. 8, giving a slight impression of the platen against the printing wheel, the shoulder 39 on the detent engages the shoulder 40 on the lever 29, and movement of the platen away from the printing wheel is prevented, so that the paper cannot be withdrawn until the actuating device has been given a complete stroke. After the actuating device has moved through its full stroke and the desired impression is made on the paper, it is necessary to move the detent 37 out of the path of the shoulder 40 in order to permit the return of the actuating device to its normal position, and this we accomplish by means of an extension 41 formed on the detent, which is engaged by the lever 29 at the end of its stroke, causing the detent to be moved to the position shown in Fig. 10. The detent is retained in this position by means of a pawl 42 pivoted to the platen lever at 43 and having a recess 44 which is adapted to engage a stop 45 on the detent. The detent 37 and the pawl 42 are connected by a spring 46, whereby there is a normal tendency to move the detent into the path of the lever 29, so as to cause engagement between the coöperating shoulders 39 and 40. Upon the return of lever 29 to its normal position, its lower forward portion 47 engages the end 48 of the pawl 42, withdrawing the recess 44 from engagement with the stop 45 on the detent 37, and thus permitting the shoulder 39 to again move into the path of the lever 29.

The printing wheel is inked for each operation by means of an inking roll 49 which is supported at the front of the casing, as shown in Figs. 6, 9, 10 and 11. To this end, a removable plate 50 is suitably secured to the casing, and carries a supporting rod 51 on which are mounted a pair of spring controlled arms 52 which carry the inking roll, and tend to hold the same against the printing wheel.

53 is an ink transferring roll to which the ink is fed from the ink-supplying roll, which we are about to describe. The ink transferring roll 53 furnishes ink to the die holder, which latter serves to ink the roll 49, and at each operation, the selected die moves from the inking roll 49 to the printing point, and is returned at the end of the operation. In this manner, a freshly inked surface is always insured.

Figure 11:
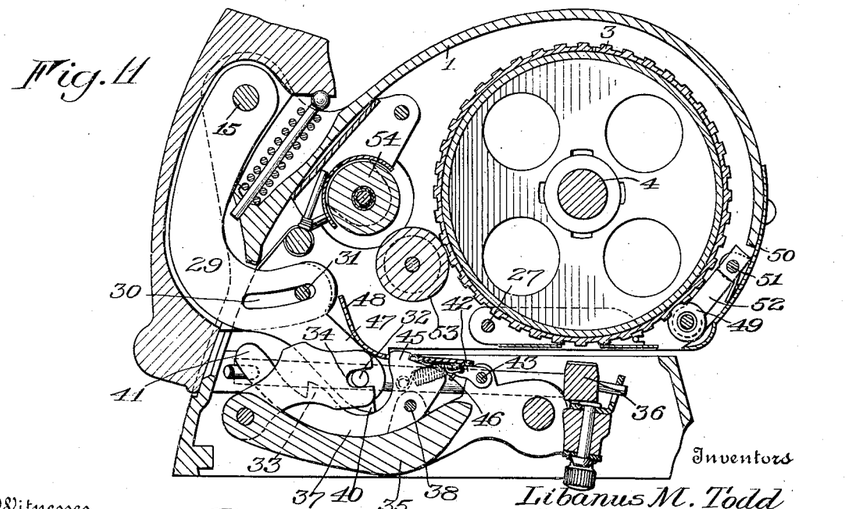
Fig. 11 is a sectional view on the line 11—11 of Fig. 2.
Figure 14:
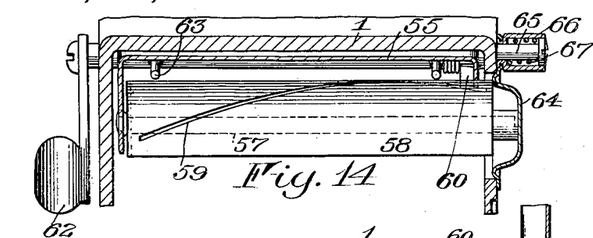
Fig. 14 is a detail sectional view taken substantially on the line 14—14 of Fig. 1.
Figure 15:
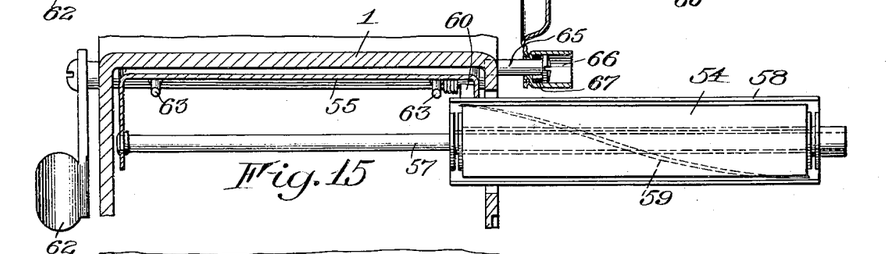
Fig. 15 is a view similar to Fig. 14, with the ink-supplying roll withdrawn from the casing.
Figure 16:
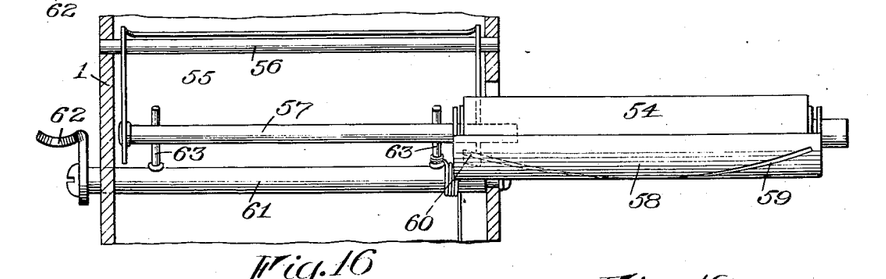
Fig. 16 is a vertical sectional view showing the same parts.
Figure 17:
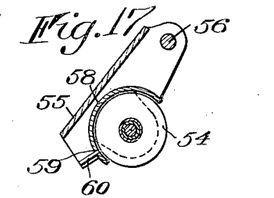
Fig. 17 is a detail sectional view of the holder for the ink-supplying roll.
Figure 18:
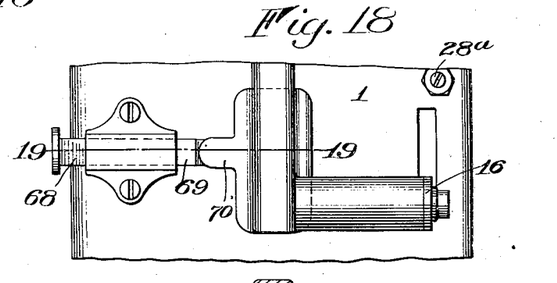
Fig. 18 is a detail rear elevation of the machine, showing the means for locking the actuating device, to prevent its complete return to original position.
Figure 19:
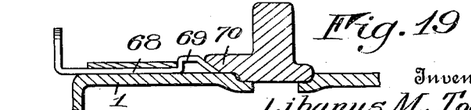
Fig. 19 is a sectional view on the line 19—19 of Fig. 18.

The ink-supplying roll is designated at 54, and is mounted on a holder, comprising in the present embodiment, the plate 55 which is pivotally mounted at 56 and carries the supporting rod 57 on which the ink-supplying roll is slidably arranged. The ink-supplying roll is mounted in a cover, preferably semi-circular in cross section, as designated at 58, and arranged to move relatively to the roll as the latter is withdrawn from the casing for inking. To this end, the cover 58 is provided with a cam slot 59 while one end of the plate 55 carries a projection 60 which engages said cam slot 59. In the normal position of the parts, the cover 58 is arranged above the ink-supplying roll, as shown in Fig. 17, and when the ink-supplying roll is withdrawn from the casing, the cover turns until it assumes the position shown in Fig. 16, where it is beneath the ink-supplying roll, and in a position to allow the roll to be readily re-inked. In order to bring the ink-supplying roll into operative engagement with the ink transferring roll 53, we provide the bar 61, rotatably arranged in the casing, and provided with the operating lever 62, said bar carrying arms 63 which engage the cover 58, as shown in Figs. 11 and 17. Thus, when the operating lever 62 is depressed, the arms 63 are moved forwardly against the cover 58, pressing the ink-supplying roll into engagement with the ink transferring roll, so that upon rotating the printing wheel, the surface of the printing wheel, as well as that of the inking roll 49, will be inked. When the ink-supplying roll is in normal position within the casing, the opening is closed by means of the cap 64 which is pivotally supported on the post 65, and carries a sleeve 66 surrounding said post and within which is housed the spring 67. The cap is normally in the position shown in Fig. 14, and when it is desired to uncover the opening, to withdraw the ink supplying roll, the sleeve 66 is pulled outwardly against the tension of the spring 67, and then rotated, as shown in Fig. 15.

Figure 12:
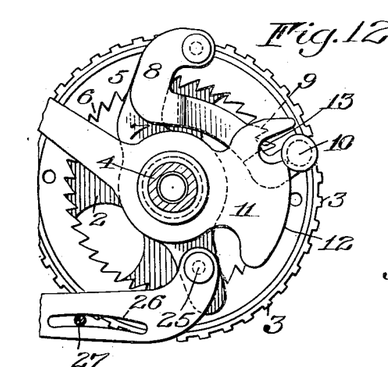
Fig. 12 is a sectional view, showing the position of the parts when the actuating device is locked to secure a repeated operation from the same die.
Figure 13:
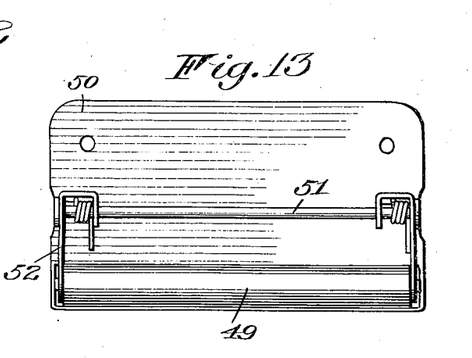
Fig. 13 is a view in elevation of the inking roll for the printing wheel, and the support for the same.

In some instances, it is desirable to repeat the same impression on different papers successively, in which case we prefer to lock the die holder in its relation to the actuating device, in order that subsequent operations of the actuating device will bring the same die into engagement with the platen and paper. To this end, in the present embodiment, we provide means for locking the actuating device in such a manner as to prevent its returning completely to its original position, and so that the pawl 9 is retained in operative engagement with the notched plate on the die holder, as shown in Fig. 12. To accomplish this, there is provided a stop 68, slidably arranged on the casing at the rear, and having a projecting portion 69 which is adapted to engage a coöperating projection 70 on the actuating device. When the stop 68 is pushed inwardly, the projecting portion 69 prevents the actuating device from making a complete return movement, and holds it in such position as to prevent the roll 10 on the arm 8 from dropping into the recess 13 on the guide plate 11. In this manner, the pawl 9 is held engaged with the notched plate, and any successive operations of the actuating device will cause the same movement of the printing wheel, and thus effect the same impression on the paper, as long as the stop 68 is held in locking position.

Figure 1:
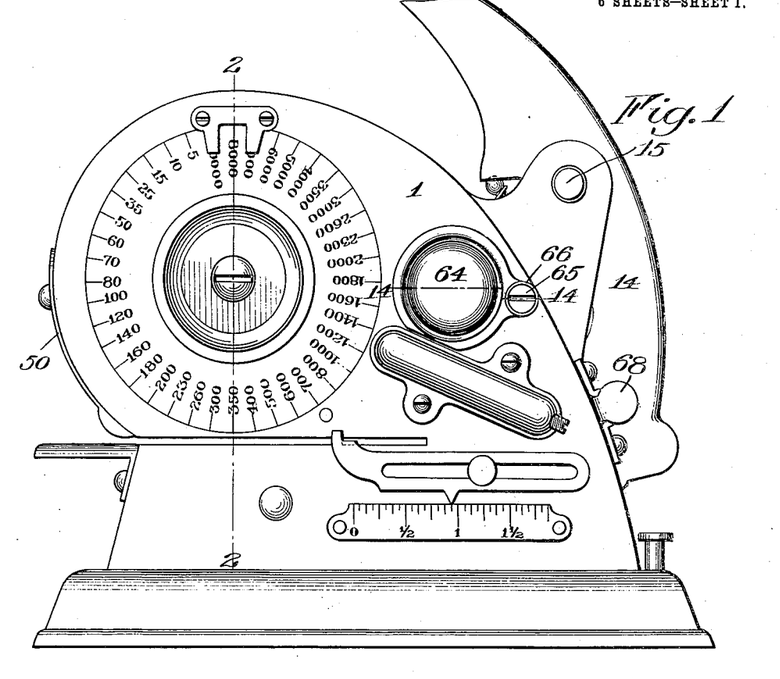
Figure 1 is a view in side elevation of a check protector, constructed in accordance with a preferred embodiment of the invention.
Figures 2, 4, 5:
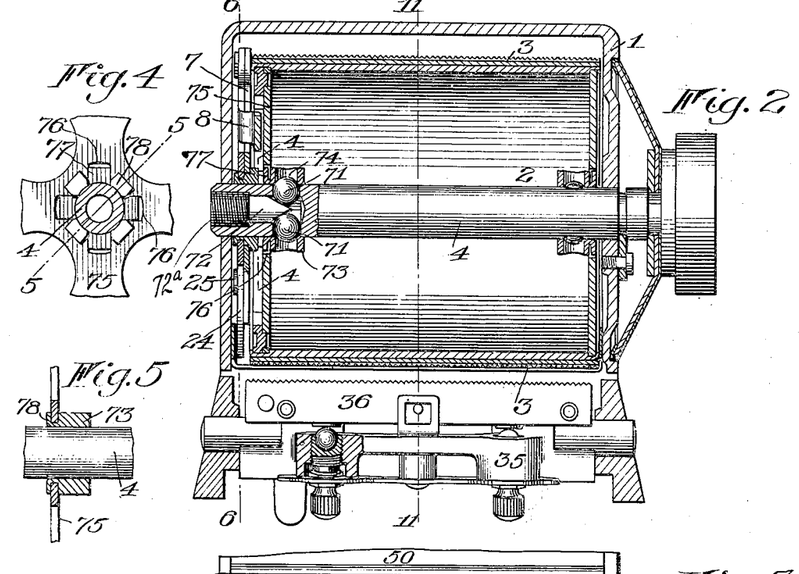
Fig. 2 is a vertical sectional view on the line 2—2 of Fig. 1.
Fig. 4 is a sectional view on the line 4—4 of Fig. 2.
Fig. 5 is a sectional view on the line 5—5 of Fig. 4.
Figure 3:
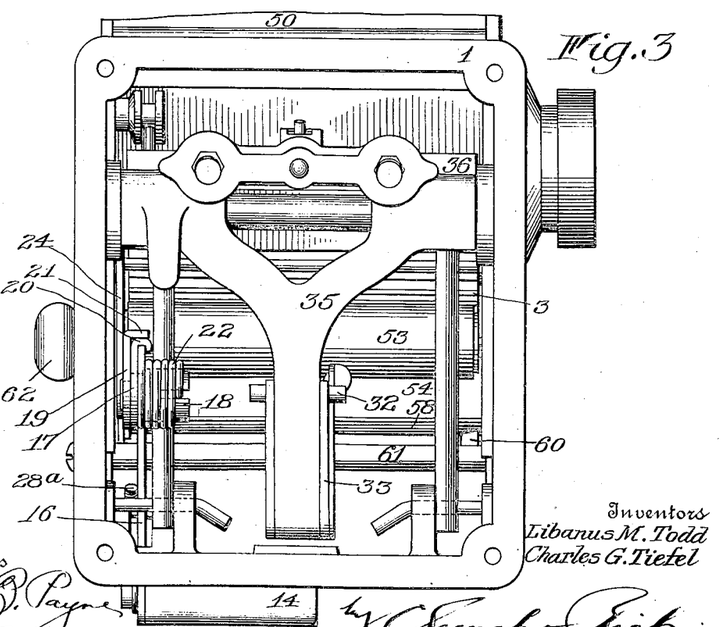
Fig. 3 is a bottom plan view.

In Figs. 2, 4 and 5, we have shown a novel construction by which the printing wheel is supported on the shaft 4. The latter is provided with suitable recesses, to receive the balls 71 which are held in engagement with the printing wheel by means of the wedge 72, secured in position by the threaded plug 72$^a$ by which means the cylinder is locked on the shaft. The balls 71 engage recesses which are formed in collars on the printing wheel and attached thereto in the manner which will now be described. The collar is shown at 73, having recesses 74 formed therein, while 75 designates the end of the printing wheel cylinder. Said end 75 is recessed, as at 76, the collar 73 being provided with up-turned lugs 77 which engage said recesses 76 so as to lock the collar for rotation with the cylinder. In order to hold the collar in engagement with the cylinder end 75, and against relative longitudinal movement, said collar is provided with upwardly extending lugs 78 which engage the outer face of the cylinder end, at points between the recesses 76.

Figure 8:
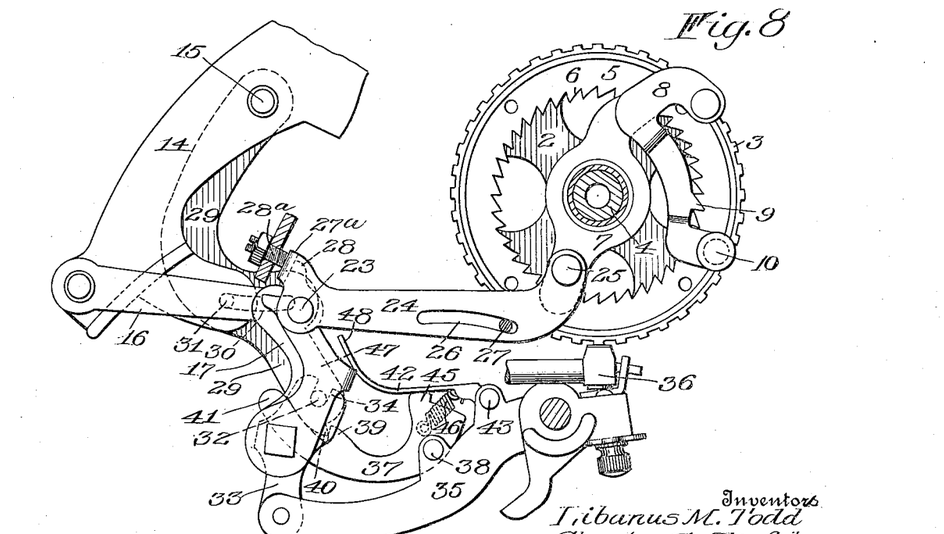
Fig. 8 is a similar view of the parts in their next position.
Figure 9:
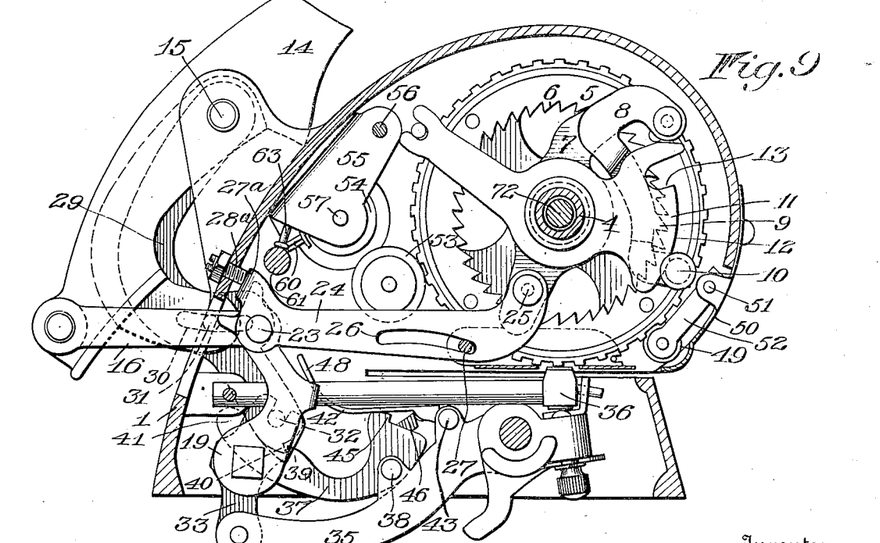
Fig. 9 is a sectional view on the line 6—6 of Fig. 2, with the parts locked, as shown in Fig. 8, and the actuating device released.
Figure 10:
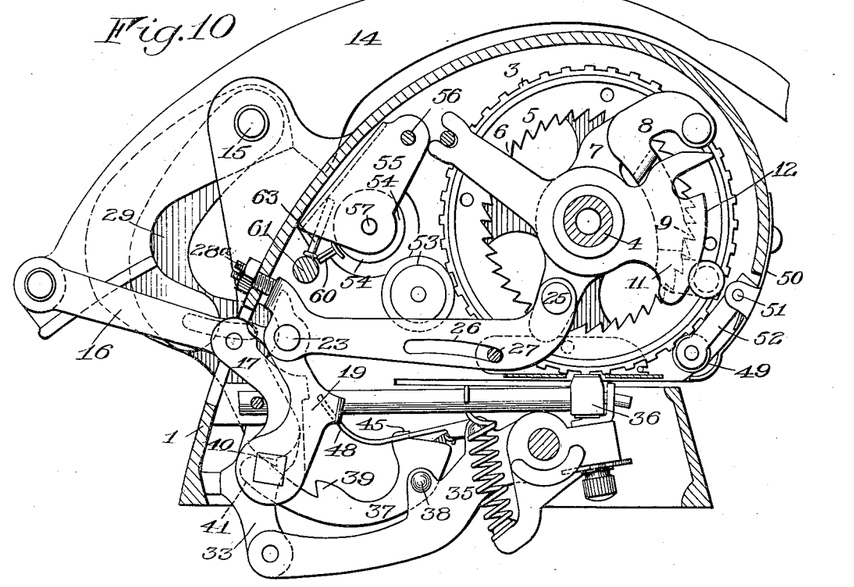
Fig. 10 is a similar view, showing the parts in their final position, when the impression is made upon the paper.

In the operation of the device, briefly described, Figs. 6 and 11 show the parts in normal position. Upon depressing the actuating device, or lever 14, the parts move initially to the position shown in Fig. 7, at which stage the printing wheel or die holder has been moved to bring the selected die from the inking roll to the printing point, and the lever 29 is about to be moved to effect operation of the platen. Fig. 8 shows the next position of the parts where the platen has been raised and the shoulders 39 and 40 are in coöperative engagement. Further movement of the actuating device brings the parts finally to the position shown in Fig. 10, where the platen is forced hard against the die holder to make the necessary impression on the paper. In case the actuating device is released after the paper is once engaged and before the final impression is made, the parts will assume the position shown in Fig. 9, in which the platen is locked in its raised position against the die holder, so that the paper cannot be withdrawn until the actuating device is moved to its extreme position.

We claim as our invention:

1. In a check protector, the combination with a die and a movable platen for bringing the paper into contact with the die, of an inking roll arranged forwardly of and in spaced relation to the printing point, an actuating device, the actuating device having initial movement independently of the platen, and means controlled by the operation of the actuating device for moving the die rearwardly from the inking roll to the printing point, and subsequently operating the platen.

2. In a check protector, the combination with a rotary die holder and a series of dies on the holder, of a movable platen for bringing the paper into contact with the die holder, an inking roll arranged forwardly of and in spaced relation to the printing point, an actuating device, the actuating device having initial movement independently of the platen, and means controlled by the operation of the actuating device for rotating the die holder to move a die rearwardly from the inking roll to the printing point, and subsequently operating the platen.

3. In a check protector, the combination with a rotary die holder, of a carrier rotatable about an axis coincident with that of the die holder, a notched surface carried by the die holder, an arm pivotally mounted on the carrier and adapted to engage said notched surface, a platen, the platen being movable upwardly into contact with the die holder to engage the paper, an actuating device, and operative connections between the actuating device and the carrier.

4. In a check protector, the combination with a rotary die holder, of an annular notched plate carried by the die holder, a carrier rotatable about an axis coincident with that of the die holder, an arm pivotally mounted on the carrier and adapted to engage said notched plate, a platen, the platen being movable upwardly into contact with the die holder to engage the paper, an actuating device, and operative connections between the actuating device and the carrier.

5. In a check protector, the combination with a rotary die holder, of an annular plate carried by the die holder and provided on its inner edge with a series of notches, a carrier rotatable about an axis coincident with that of the die holder, an arm pivotally mounted on the carrier and adapted to engage one of said notches, a platen, the platen being movable upwardly into contact with the die holder to engage the paper, an actuating device, and operative connections between the actuating device and the carrier.

6. In a check protector, the combination with a rotary die holder, of an annular plate carried by the die holder and provided on its inner edge with a series of notches, a carrier rotatable about an axis coincident with that of the die holder, an arm pivotally mounted on the carrier and adapted to engage one of said notches, a platen, the die holder and platen being relatively movable to engage the paper, a stationary guide, a projection on the arm coöperating with said guide, an actuating device, and operative connections between the actuating device and the carrier.

7. In a check protector, the combination with a rotary die holder, having a notched surface, of a carrier rotatable about an axis coincident with that of the die holder, an arm pivotally mounted on the carrier and adapted to engage said notched surface, means for limiting the movement of the carrier, a platen, the die holder and platen being relatively movable to engage the paper, an actuating device, and a yieldable connection between the actuating device and the carrier.

8. In a check protector, the combination with a rotary die holder, of an annular notched plate carried by the die holder, a carrier rotatable about an axis coincident with that of the die holder, means for limiting the movement of the carrier, an arm pivotally mounted on the carrier and adapted to engage said notched plate, a platen, the platen being movable upwardly into contact with the die holder to engage the paper, an actuating device, and a yieldable connection between the actuating device and the carrier.

9. In a check protector, the combination with a rotary die holder, of an annular plate carried by the die holder and provided on its inner edge with a series of notches, a carrier rotatable about an axis coincident with that of the die holder, means for limiting the movement of the carrier, an arm pivotally mounted on the carrier and adapted to engage one of said notches, a platen, the platen being movable upwardly into contact with the die holder to engage the paper, an actuating device, and a yieldable connection between the actuating device and the carrier.

10. In a check protector, the combination with a rotary die holder, of an annular plate carried by the die holder and provided on its inner edge with a series of notches, a carrier rotatable about an axis coincident with that of the die holder, means for limiting the movement of the carrier, an arm pivotally mounted on the carrier and adapted to engage one of said notches, a platen, the die holder and platen being relatively movable to engage the paper, a stationary guide, a projection on the arm, coöperating with said guide, an actuating device, and operative connections between the actuating device and the carrier, said connections including a yieldable member.

11. In a check protector, the combination with a rotary die holder, a notched plate carried by the die holder, a movable carrier, an arm mounted on the carrier, an actuating device operatively connected to the carrier, the initial movement of the actuating device serving to effect engagement of the arm with said notched plate, a platen, the die holder and platen being relatively movable to engage the paper, operative connections between the actuating device and the platen, and a movable stop adapted to engage the actuating device to prevent its complete return to original position.

12. In a check protector, the combination with a rotary die holder, of an annular notched plate carried by the die holder, a carrier rotatable about an axis coincident with that of the die holder, an arm pivotally mounted on the carrier and adapted to engage said notched plate, the die holder and platen being relatively movable to engage the paper, an actuating device operatively connected to the carrier, the initial movement of the actuating device serving to effect engagement of the arm with said notched plate, operative connections between the actuating device and the platen, and means coöperating with the actuating device to limit the return movement thereof and retain said arm in engagement with the notched plate.

13. In a check protector, the combination with a casing, of a rotary die holder arranged therein, an annular notched plate carried by the die holder, a carrier rotatable about an axis coincident with that of the die holder, an arm pivotally mounted on the carrier and adapted to engage said notched plate, the die holder and platen being relatively movable to engage the paper, an actuating device operatively connected to the carrier, the initial movement of the actuating device serving to effect engagement of the arm with said notched plate, operative connections between the actuating device and the platen, and a stop adjustable on the casing and adapted to engage the actuating device to limit the movement of said arm.

14. In a check protector, the combination with a casing, of a pivoted holder, an ink supplying roller mounted in the holder, a cover for the ink supplying roller, said cover being slidably mounted and having a cam slot extending longitudinally thereof, and a projection carried by the holder and coöperating with said cam slot.

15. In a check protector, the combination with a casing, of an ink supplying roller mounted in the casing, a cover for the ink supplying roller, said cover being slidably mounted in the casing, and means for rotating the cover relatively to the ink supplying roll as the latter is withdrawn from the casing.

16. In a check protector, the combination with a shaft, of a collar removably secured to the shaft, a cylindrical die holder on the shaft having an end arranged adjacent to said collar and provided with recesses about the shaft, lugs formed on the collar and engaging said end, and additional lugs formed on the collar and arranged in the recesses of said end.

LIBANUS M. TODD.
CHARLES G. TIEFEL.

Witnesses:
GRACE D. KELLER,
A. M. REILLY.